United States Patent
Akerib

(10) Patent No.: US 12,488,002 B2
(45) Date of Patent: Dec. 2, 2025

(54) ASSOCIATIVE GRAPH SEARCH

(71) Applicant: GSI Technology Inc., Sunnyvale, CA (US)

(72) Inventor: Avidan Akerib, Tel Aviv (IL)

(73) Assignee: GSI Technology Inc., Sunnyvale, CA (US)

( * ) Notice: Subject to any disclaimer, the term of this patent is extended or adjusted under 35 U.S.C. 154(b) by 132 days.

(21) Appl. No.: 17/735,139

(22) Filed: May 3, 2022

(65) Prior Publication Data

US 2022/0374432 A1 Nov. 24, 2022

Related U.S. Application Data

(60) Provisional application No. 63/192,032, filed on May 23, 2021, provisional application No. 63/334,216, filed on Apr. 25, 2022.

(51) Int. Cl.
*G06F 16/2455* (2019.01)
*G06F 16/22* (2019.01)

(52) U.S. Cl.
CPC .... *G06F 16/24553* (2019.01); *G06F 16/2264* (2019.01)

(58) Field of Classification Search
CPC .............. G06F 16/24553; G06F 16/2264
See application file for complete search history.

(56) References Cited

U.S. PATENT DOCUMENTS

| | | | |
|---|---|---|---|
| 10,929,751 B2 | 2/2021 | Ehrman et al. | |
| 11,409,752 B1 * | 8/2022 | Qadrud-Din | G06F 40/126 |
| 2013/0230255 A1 * | 9/2013 | Wang | G06F 16/583 382/201 |
| 2014/0059037 A1 * | 2/2014 | Swaminathan | G06F 16/56 707/713 |
| 2018/0217836 A1 * | 8/2018 | Johnson | G06F 9/28 |
| 2018/0285685 A1 * | 10/2018 | Singh | G06F 16/9038 |
| 2019/0087692 A1 * | 3/2019 | Ding | G06F 18/22 |
| 2019/0272344 A1 * | 9/2019 | Lu | G06F 18/21 |
| 2020/0410003 A1 * | 12/2020 | Simhadri | G06F 16/9035 |
| 2021/0042357 A1 * | 2/2021 | Wang | G06F 16/9574 |

\* cited by examiner

*Primary Examiner* — Jensen Hu
(74) *Attorney, Agent, or Firm* — Heidi Brun Associates Ltd.; Heidi M. Brun

(57) ABSTRACT

An associative graph search system includes a KNN graph determiner to determine in advance W neighbors of each item in a dataset and to store each item and its neighbors in a KNN graph, a reduced dimension vector finder implemented on an associative processing unit (APU) to find a first number of first nearest neighbors of a query vector, the APU operating in a constant complexity irrespective of the size of the number, a result expander to find for each first nearest neighbor, W second nearest neighbors using the KNN graph thereby creating a group of neighbors, and a KNN full dimension vector re-ranker to find a final number of full dimension nearest neighbors of the full dimension query vector from the group of neighbors.

9 Claims, 6 Drawing Sheets

ASSOCIATIVE GRAPH SEARCH

CROSS REFERENCE TO RELATED APPLICATIONS

This application claims priority from U.S. provisional patent application 63/192,032, filed May 23, 2021, and U.S. provisional patent application 63/334,216, filed Apr. 25, 2022, both of which are incorporated herein by reference.

FIELD OF THE INVENTION

The present invention relates to associative memory generally and to a method for using a KNN graph in conjunction with an APU to provide fast and accurate K nearest neighbors.

BACKGROUND OF THE INVENTION

An object (such as picture, text, music etc.) may be semantically represented in a dataset by a full dimension feature vector of numbers. The object raw data is represented by numerical features, also called feature embeddings, that can be processed while preserving the information of the original object.

The feature vector may be obtained by using a neural network that receives the object as input and provides as output a full dimension feature vector (e.g., 128K×1024 words). Feature vectors can be compared using the K nearest neighbors (KNN) algorithm known in the art and various applications use the KNN search algorithm to find K (e.g., 25) objects (from a large dataset) that most closely resemble a query object. Such applications include face recognition, image recognition, document and text search, music recognition and the like.

The applications can store the large dataset of M feature vectors (M may be several millions) in an Associative Processing Unit (APU), such as the Gemini Associative Processing Unit of GSI Technology Inc. of the USA, where the KNN search algorithm is very fast and performed in a constant complexity irrespective of the size of the dataset. The KNN implementation on Gemini is described in U.S. Pat. No. 10,929,751, assigned to Applicant and incorporated herein by reference. Storing the full dimension vectors in the APU utilizes a lot of memory. When the associative memory of the APU is not large enough to contain the entire dataset of feature vectors, the entire dataset is stored in the memory of a host device which copies different parts of the dataset at a time to the associative memory for processing.

It is possible to improve the performance and memory utilization of the KNN search algorithm by reducing the dimensions of the feature vectors (e.g., to 512-2000 bits). A reduced dimension vector of each element may be created (by methods such as Neural Proxy Hash (NPH) or Local Sensitivity Hashing (LSH)) and stored in the APU instead of the full dimension feature vector that may be stored in the host. Performing a KNN search using reduced dimension vectors is faster than a KNN search performed on the full dimension feature vectors since the APU is very efficient in performing binary operations, such as Hamming distance, L1, L2, Tanimoto similarity search and the like, compared to operating on full floating-point MAC performed on a GPU or a CPU.

It may be noted that smaller vectors imply faster search and less memory utilization in the APU. On the other hand, smaller vectors produce less accurate results since each reduced dimension vector contains less information.

To maintain the required accuracy when working with reduced dimension vectors, the KNN search algorithm returns a larger number, $K_{rdv}$, of reduced dimension neighboring vectors (e.g., 4000) compared to the number original number K (e.g., 25) of full dimension neighboring vectors when working with the full dimension vectors. It may be noted that $K_{rdv}$ is much larger than K.

In addition, a final re-ranking step should be performed in the host to search the final 25 full dimension feature vectors (out of the 4000 that were found using the reduced dimension vectors) that are the nearest neighbors of the query vector. In this step, the host should retrieve the full dimension vectors (associated with a larger number $K_{rdv}$ of reduced dimension vectors) from the database and perform a second KNN search operation between the full dimension vector of the query object and the larger number $K_{rdv}$ of full dimension vectors to find the final original number K of nearest neighbors.

FIG. 1, to which reference is now made, is a schematic illustration of a prior art system 10 that receives as input a full dimension query vector 11 and provides as output a list 18 of its K nearest full dimension neighbor vectors. System 10 comprises a host 15 connected to an APU 12 and to a database 16 storing a large dataset of full dimension vectors. APU 12 comprises an associative memory array 13 storing a large dataset of records. Each record in memory array 13 includes an index and a reduced dimension vector associated with a full dimension vector in database 16.

Host 15 passes a full dimension query vector 11 to APU 12 that reduces its dimension and performs a first KNN search algorithm on database 16 to find a list of the $K_{rdv}$ nearest neighbors of query vector 11 (note that the KNN is performed on reduced dimension vectors). Host 15 uses a CPU or a GPU for a final re-rank step to provide the final K nearest neighbors out of the $K_{rdv}$ vectors found by APU 12.

FIG. 2, to which reference is now made, is a schematic illustration of a flow that may be implemented by system 10. The input to the flow is the full dimension query vector 11. System 10 may, in step 22, reduce the dimension of full dimension query vector 11 and, in step 24, activate a first KNN search algorithm to find a relatively large number $K_{rdv}$ of reduced dimension nearest neighbors and provide their indexes in database 16. System 10 may perform step 22 and step 24 in APU 13 (FIG. 1) and provide the indexes to host 15 that may proceed with the next steps. In step 26 host 15 may fetch the $K_{rdv}$ full dimension vectors from database 16 and in step 28 activate a second KNN search algorithm to re-rank the results and find the final K full dimension nearest neighbor and provide them as output 18.

It may be noted that, if the dimension should be further reduced (to save memory in APU 12), the number of objects $K_{rdv}$ that is needed to be found by the first KNN search operation in APU 12 should be increased in order to keep the needed accuracy and to perform the re-rank operation on host 15 with a higher number of vectors, since the lower accuracy provided by the reduced dimension vectors may be compensated by increasing their number.

The search in APU 12 is very fast and is performed in a constant complexity regardless of the size of the dataset, but the Input/Output (IO) operation needed to be performed by host 15 for the final re-rank operation becomes slower as the number of indexes that should be returned is increased. When operating with reduced dimension vectors, the host needs to retrieve a relatively large number of indexes which reduces the performance of the overall operation.

SUMMARY OF THE PRESENT INVENTION

There is provided, in accordance with a preferred embodiment of the present invention, an associative graph search system that includes a KNN graph determiner to determine in advance W neighbors of each item in a dataset and to store each item and its neighbors in a KNN graph, a reduced dimension vector finder implemented on an associative processing unit (APU) to find a first number of first nearest neighbors of a query vector, the APU operating in a constant complexity irrespective of the size of said the number, a result expander to find for each first nearest neighbor, W second nearest neighbors using the KNN graph thereby creating a group of neighbors and a KNN full dimension vector re-ranker to find a final number of full dimension nearest neighbors of the full dimension query vector from the group of neighbors.

Additionally, in accordance with an embodiment of the present invention, the reduced dimension vector finder uses a similarity search method which is Hamming distance, L1, L2, or Tanimoto.

Moreover, in accordance with an embodiment of the present invention, the associative graph search system expands the group of neighbors by activating the result expander on the second nearest neighbors.

There is provided, in accordance with a preferred embodiment of the present invention, a method that includes the following steps: receiving a full dimension query vector, in an associative memory unit (APU), reducing a size of the query vector, activating in the APU a first K nearest neighbor (KNN) algorithm to find a small number of nearest neighbors of the query vector, the KNN algorithm operating in a constant complexity irrespective of the size of the small number, expanding in a host processor the small number to a larger number of nearest neighbors by using a KNN graph, fetching in the host processor full dimension vectors associated with the larger number of nearest neighbors, and activating in the host processor a second K nearest neighbor (KNN) algorithm to find final K full dimension nearest neighbors of the query vector.

Additionally, in accordance with an embodiment of the present invention, the activating the first K nearest neighbor (KNN) algorithm includes using a similarity search method which is Hamming distance, L1, L2, or Tanimoto.

Moreover, in accordance with an embodiment of the present invention, the expanding step is activated on the larger number of nearest neighbors to further expand the number of nearest neighbors.

There is provided, in accordance with a preferred embodiment of the present invention, a method associative graph search for finding a K nearest neighbors of a query object, the method includes: having a KNN graph containing an index of an object to a database and W indexes of known neighbors of the object stored in a host processor, having a plurality of reduced dimension vectors stored in an associative memory unit (APU), obtaining in the APU a reduced dimension query vector of the query object, performing in the APU a first K nearest neighbor (KNN) algorithm to find a first set of nearest neighbor objects of the reduced dimension query vector in a constant complexity irrespective of the size of said first set, obtaining in the host processor for each of the nearest neighbor object additional known neighbors from the KNN graph, fetching in the host processor full dimension vectors of all the first neighbors and the additional known neighbors and performing in the host processor a second KNN search algorithm to the K nearest neighbors of the query object out of the first neighbors and the additional known neighbors.

Furthermore, in accordance with an embodiment of the present invention, the performing a first K nearest neighbor (KNN) algorithm includes using a similarity search method which is Hamming distance, L1, L2, or Tanimoto.

Moreover, in accordance with an embodiment of the present invention, the obtaining step is activated on the known neighbors to further expand the number of the nearest neighbors.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
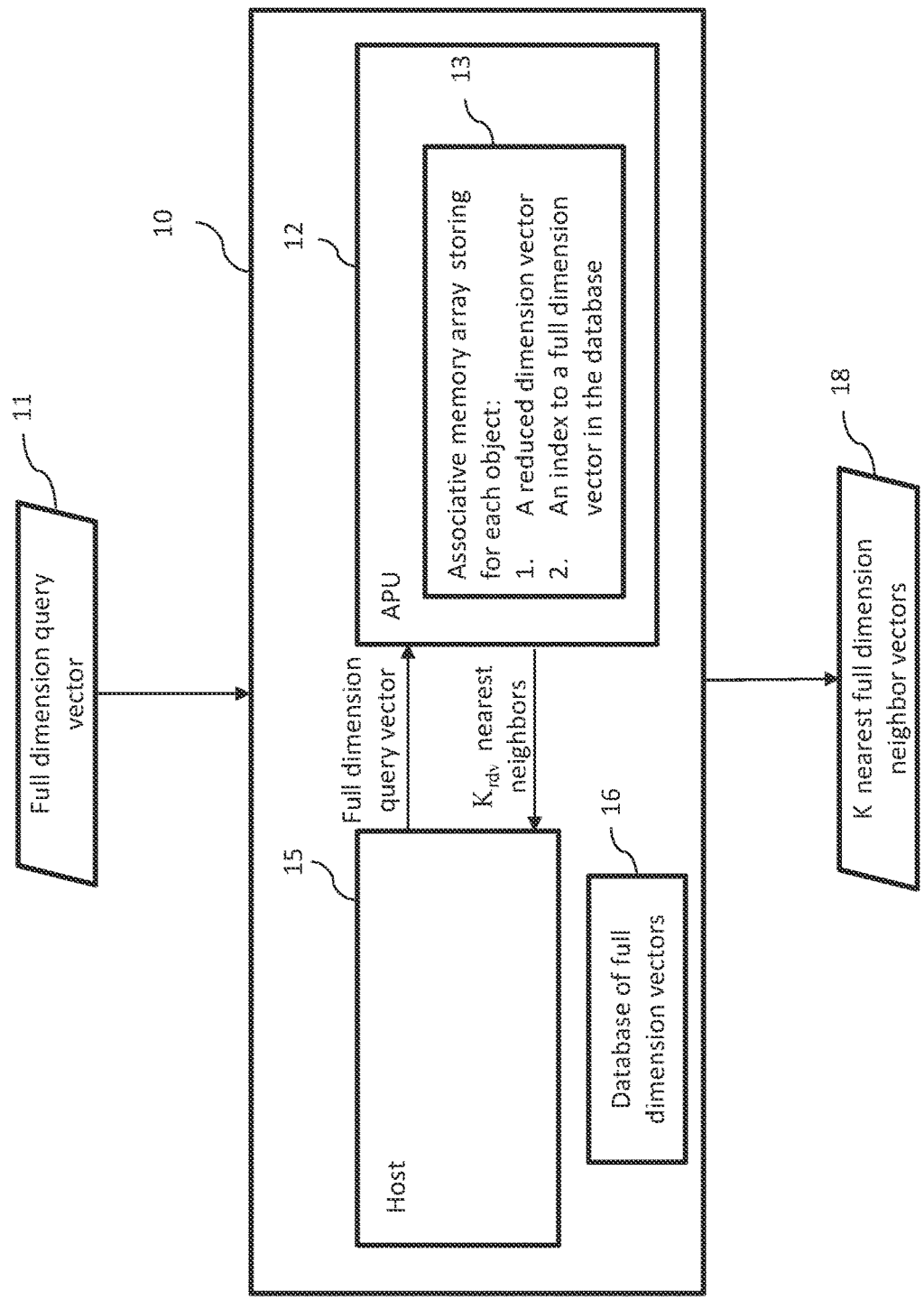
FIG. 1 is a schematic illustration of a system for finding the K nearest full dimension neighbor vectors of a full dimension query vector, known in the art.
Figure 2:
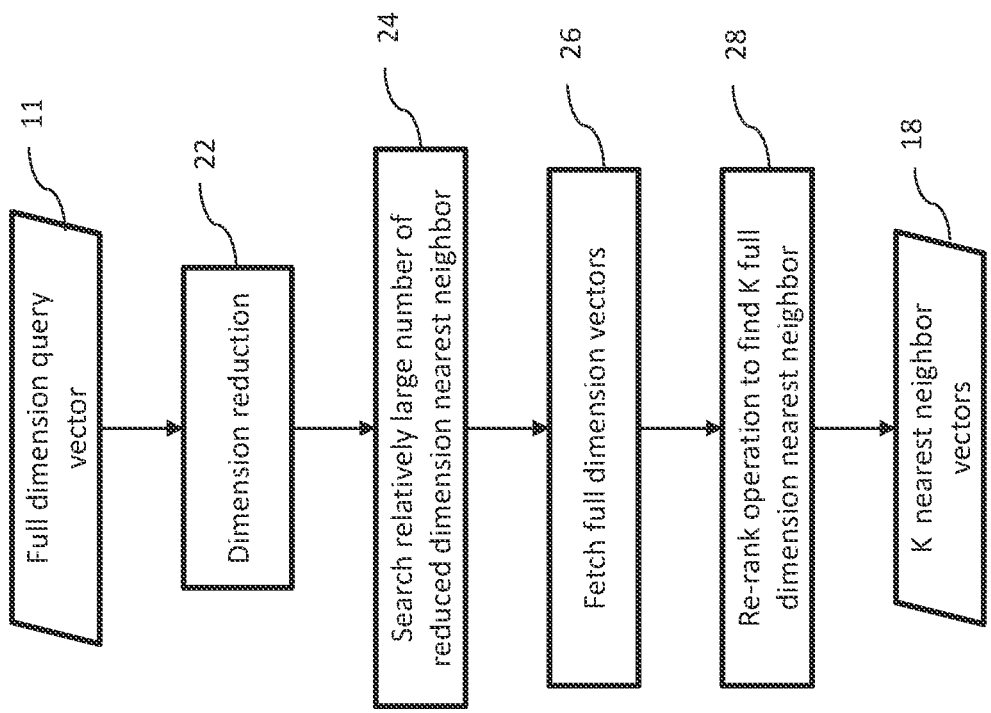
FIG. 2 is a schematic illustration of a flow that may be implemented by the system of FIG. 1.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that the number of neighbors that need to be found by the first KNN search operation may be reduced by pre-calculating and storing in advance a KNN graph containing for each object its W nearest neighbors (More information on KNN graph may be found in the Wikipedia article 'Nearest neighbor graph' found at https://en.wikipedia.org/wiki/Nearest_neighbor_graph). The first KNN search operation performed on the reduced dimension vectors on the APU may find a smaller number $K_{graph}$ of neighbors and the host processor may use the KNN graph to get additional neighbors and increase the number of objects needed for the second KNN search operation in the re-rank step to keep the needed accuracy.

When using a KNN graph, the number $K_{graph}$ of reduced dimension vectors to be found can be reduced by at least the order of magnitude of W while maintaining the accuracy of the result. It may be noted that $K_{graph} \ll K_{rdv}$ and W may be relatively small (e.g., 10). For example, for $K_{graph}$=100 and W=10, the number of I/O operations will be 100 while the number of objects available to host 15 for the re-rank operation will be 100*(10+1)=1100. By repeatedly using the KNN graph N times, each time for the additional W neighbors, the number of objects available to host 15 for the re-rank operation may be increased exponentially to $W^N$, while keeping the number of I/O operations $K_{graph}$ small.

Figure 3:
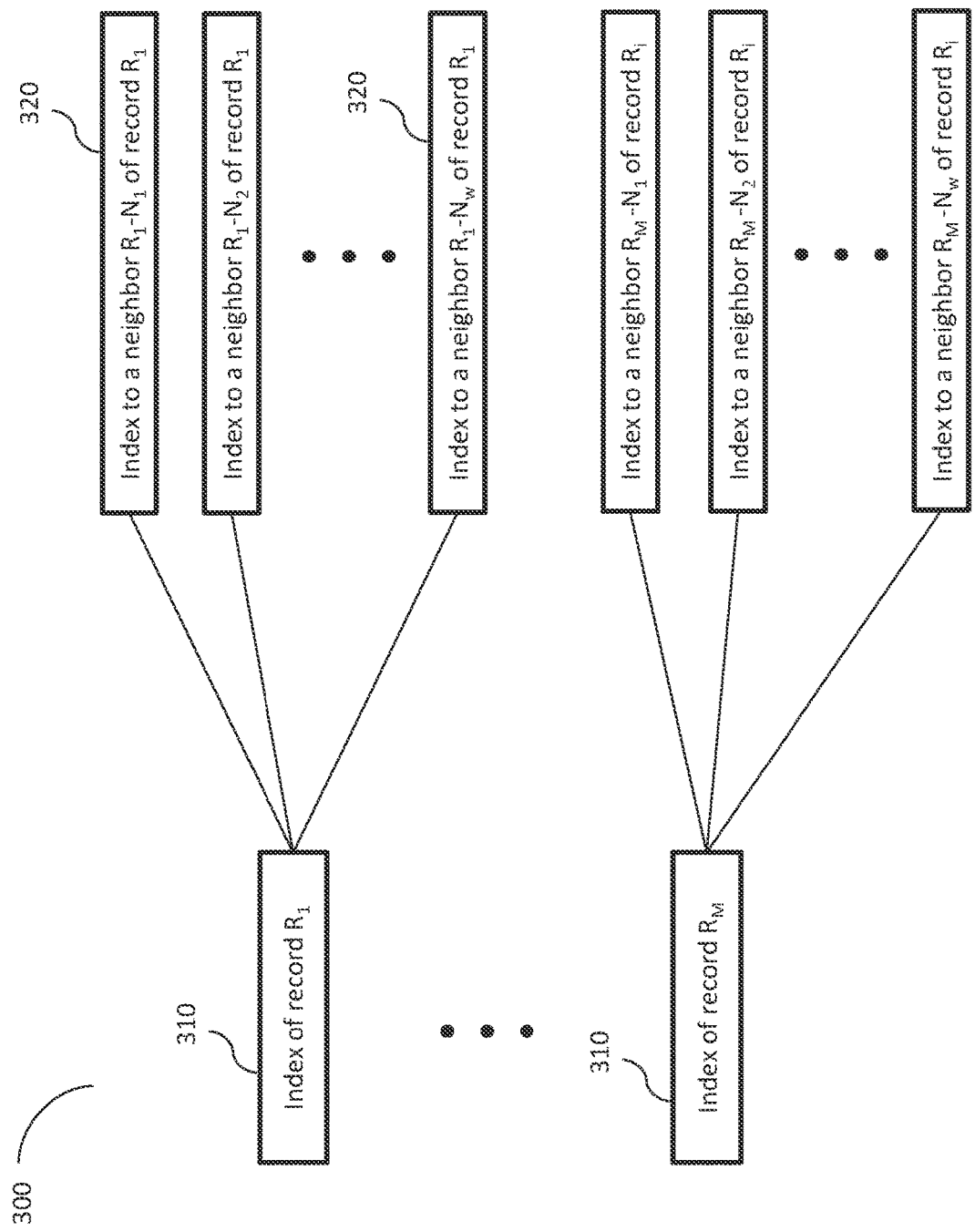
FIG. 3 is a schematic illustration of the structure of a KNN graph, in accordance with an embodiment of the present invention.

FIG. 3, to which reference is now made, is a schematic illustration of a KNN graph 300, calculated and stored in advance in accordance with an embodiment of the present invention. KNN graph may have several levels of nodes, where each level comprises indices to full dimension vectors stored in database 16. The first level of KNN graph 300 comprise M nodes 310 (M is the number of elements in database 16), and each node 310 comprises an index Ri to a full dimension vector stored in database 16 and W pointers to second level nodes 320. Each second level node 320 comprises an index Ri-Nj to a full dimension vector that is a neighbor of Ri.

Figure 4:
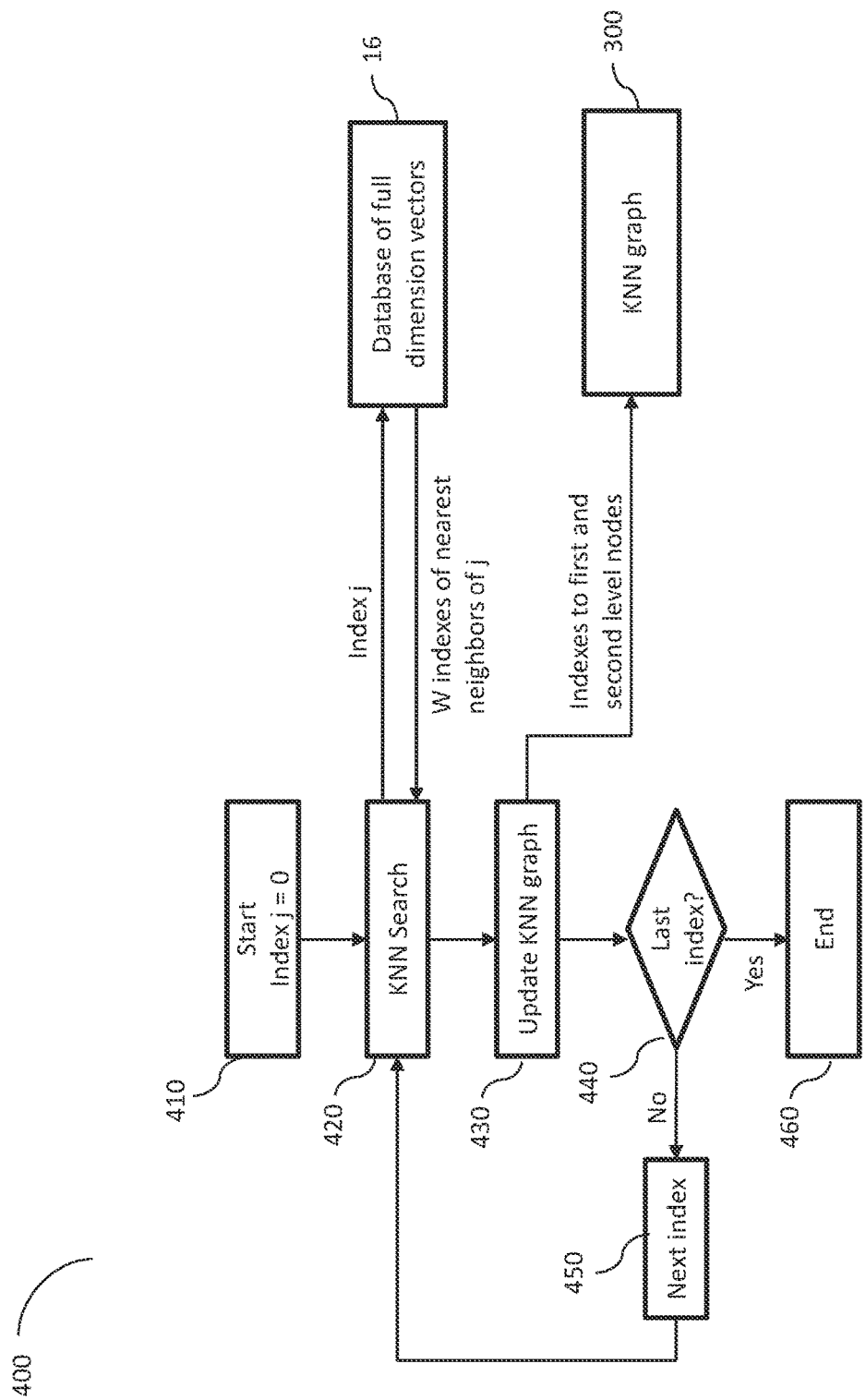
FIG. 4 is a schematic illustration of a flow used to build the KNN graph of FIG. 3, in accordance with an embodiment of the present invention.

FIG. 4, to which reference is now made, is a schematic illustration of a flow implemented by a KNN graph determiner 400 responsible to create KNN graph 300 in advance. KNN graph determiner 400 may perform a KNN search for each record in full dimension vector database 16 and find its W nearest neighbors. KNN graph determiner 400 may create a graph listing for each object in the full dimension database 16 its index and the indices of its W nearest neighbors.

In step 410, KNN graph determiner may initiate the first index j of a full dimension vector stored in database 16 to 0. In step 420, KNN graph determiner 400 may perform a KNN search to locate the indexes of the W nearest neighbors of full dimension vector with index j. In step 430, KNN graph determiner 400 may update KNN graph 300 and create a node 310 with index j, and W nodes 320, each with the index of one of the located W nearest neighbors. In step 440, KNN graph determiner 400 may check if the last full dimension vector of database 16 has been handled and if not advance to the next index in step 450 and return to step 420 to create the nodes for the next object in database 16. If the last object has been handled, KNN graph determiner 400 may conclude its operation in step 460. The created KNN graph 300 includes for each object stored in database 16 its index and additional W indexes of its W nearest neighbors.

Figure 5:
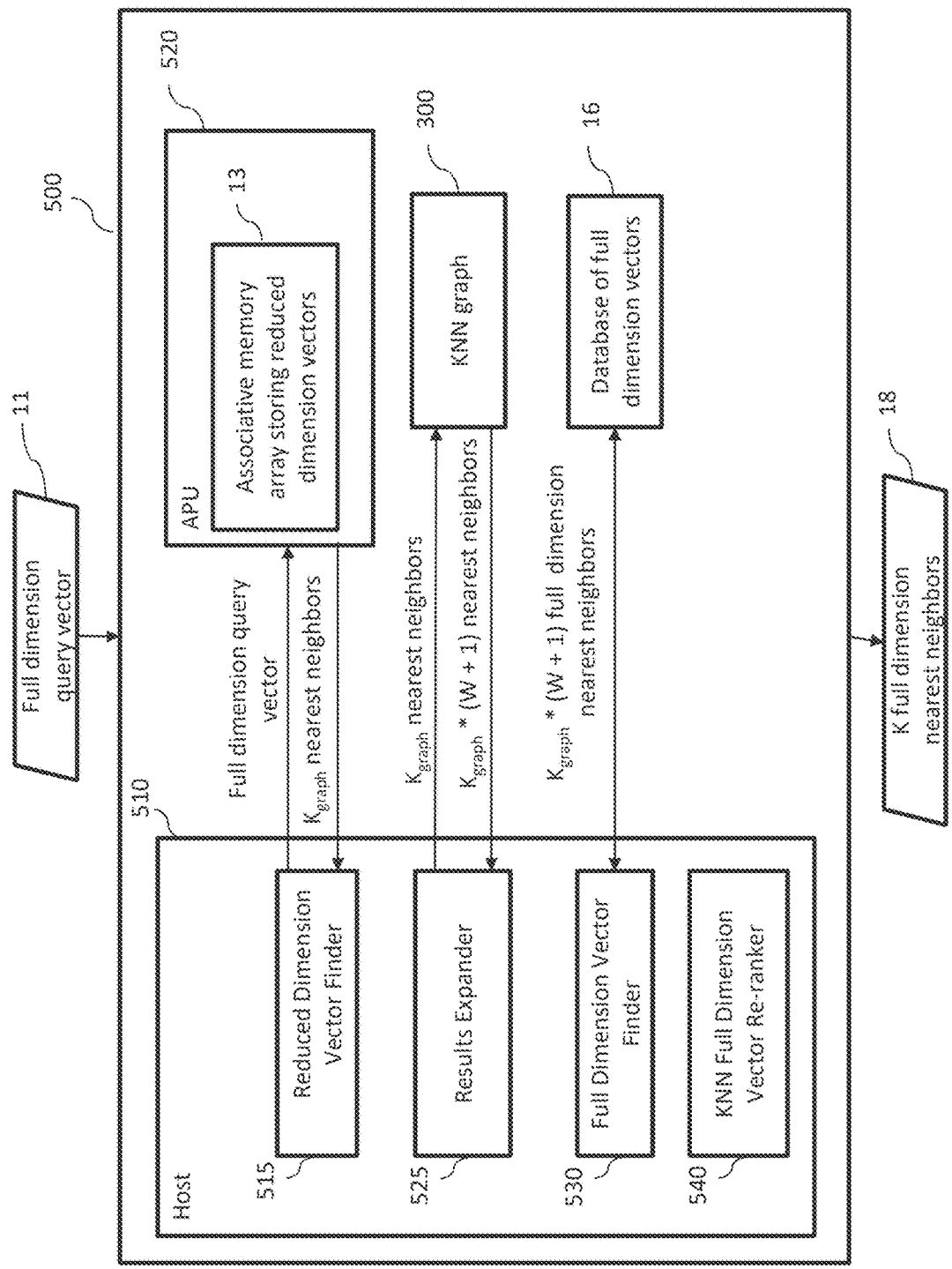
FIG. 5 is a schematic illustration of an associative graph search system, constructed and operative in accordance with a preferred embodiment of the present invention that uses the KNN graph of FIG. 3 for expanding the number of nearest neighbors without impairing the performance.

FIG. 5, to which reference is now made, is a schematic illustration of associative graph search system 500 constructed and implemented in accordance with an embodiment of the present invention. System 500 comprise a host 510, an APU 520, KNN graph 300 and database 16 of full dimension vectors.

APU 520 comprises an associative memory array 13 that may receive full dimension query vector 11, reduce its dimensions, perform a KNN search algorithm on a dataset of reduced dimension vectors and provide a predetermined number of nearest neighbors of query vector 11 in a very fast and constant complexity regardless of the number of neighbors.

Host 510 comprises a reduced dimension vector finder 515, a results expander 525, a full dimension vector finder 530 and a KNN full dimension vector re-ranker 540. Host 510 is in communication with APU 520, KNN graph 300 and database 16 of full dimension vectors.

Reduced dimension vector finder 515 may use APU 520 to find a relatively small number ($K_{graph}$) of nearest neighbors. Results expander 525 may use KNN graph 300 to expand the number of neighbors (to maintain the accuracy of the entire computation). Results expander 525 may use graph 300 to locate the relatively small number of nearest neighbors in first level nodes 310 and provide their W neighbors from their associated second level nodes 320 and expand the number of vectors available to host 510 from $K_{graph}$ to $K_{graph}*(W+1)$.

Results expander 525 may repeat its operation and expand the number of vectors again and again by locating the available vectors in first level nodes 310 and provide the W neighbors of each until the number of vectors available to host 510 is sufficient for the re-rank operation.

Full dimension vector finder 530 may fetch full dimension vectors associated with the available indexes from database 16 and KNN full dimension vector re-ranker 540 may perform a KNN search algorithm to find the final K nearest neighbors of vector 11 out of the available full dimension vectors.

Figure 6:
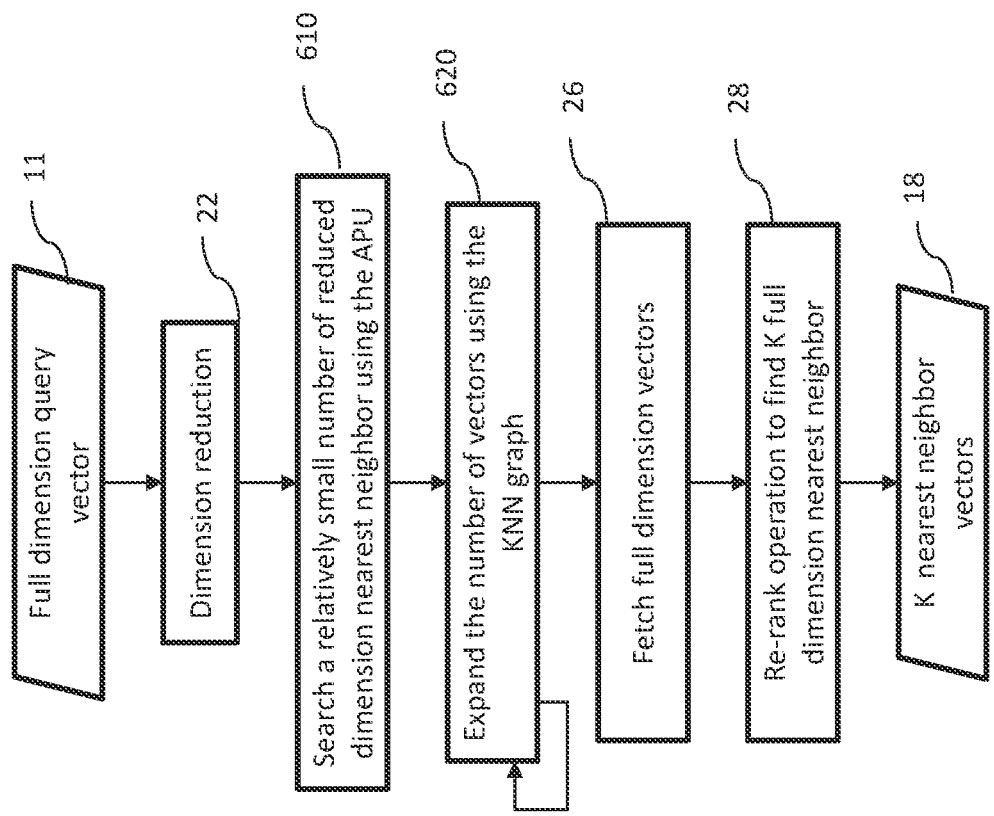
FIG. 6 is a schematic illustration of a flow that may be implemented by the associative graph search system of FIG. 5 in accordance with an embodiment of the present invention.

FIG. 6, to which reference is now made, is a schematic illustration of a flow that may be implemented by associative graph search system 500. The input to the flow is a full dimension query vector 11. System 500 may, in step 22, reduce the dimension of full dimension query vector 11 and, in step 610, activate a first KNN search algorithm to find a relatively small number ($K_{rdv}$) of reduced dimension nearest neighbors and provide their indices. In step 620, associative graph search system 500 may expand the relatively small number of vectors by using KNN graph 300 to bring for each vector its W neighbors. System 500 may repeat step 620 and expand the number of vectors until the number is sufficient.

In step 26, host 510 may fetch the expanded number of full dimension vectors from database 16 and in step 28 activate a second KNN search algorithm to re-rank the results and find the final K full dimension nearest neighbor and provide them as output 18.

It may be noted that using associative graph search system 500 may enable using much smaller dimension vectors to be searched in the KNN search step 610 since the number of neighbors can be expanded in host 510 using the KNN graph that provides additional neighbors to each vector found during the KNN search step. The overall operation of associative graph search system 500 may be much faster, since APU 520 may output far fewer results and KNN graph 300 may compensate by expanding the number of neighbors provided by APU 520.

It may be appreciated that the steps shown for the flows herein above are not intended to be limiting and that each flow may be practiced with variations. These variations may include more steps, less steps, changing the sequence of steps, skipping steps, among other variations which may be evident to one skilled in the art.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:
1. An associative graph search system comprising:
 a K-nearest neighbor (KNN) KNN graph determiner to determine in advance W neighbors of each item in a full dimension vector dataset and to store each item and its neighbors in a KNN graph;

an associative processing unit (APU) comprising an associative memory array storing at least a dataset of reduced dimension vectors and activating a KNN search within said associative memory array on said dataset;

a reduced dimension vector finder to instruct said APU to find a first number of first nearest neighbors of a reduced dimension version of a full dimension query vector in said dataset, said APU operating in a constant complexity irrespective of the size of said first number;

a result expander to find for each first nearest neighbor, W second nearest neighbors using said KNN graph thereby creating a group of neighbors; and a KNN full dimension vector re-ranker to find a final number of full dimension nearest neighbors of said full dimension query vector from said group of neighbors.

2. The associative graph search system of claim 1, said reduced dimension vector finder to use a similarity search method which is one of: Hamming distance, L1, L2, and Tanimoto.

3. The associative graph search system of claim 1 said associative graph search system to expand said group of neighbors by activating said result expander on said second nearest neighbors.

4. A method comprising:
a host processor providing a received a full dimension query vector to an associative processing unit (APU) comprising an associative memory array storing at least a dataset of reduced dimension vectors;

in said APU, reducing a dimension of said query vector to generate a reduced dimension query vector;

said APU activating a first K nearest neighbor (KNN) algorithm within said associative memory array to find a small number of nearest neighbors of said reduced dimension query vector in said dataset, said KNN algorithm operating in a constant complexity irrespective of the size of said small number;

expanding in said host processor said small number to a larger number of nearest neighbors by using a KNN graph;

fetching in said host processor full dimension vectors associated with said larger number of nearest neighbors; and activating in said host processor a second K nearest neighbor (KNN) algorithm to find final K full dimension nearest neighbors of said query vector.

5. The method of claim 4 wherein said activating a first K nearest neighbor (KNN) algorithm comprises using a similarity search method which is one of: Hamming distance, L1, L2, and Tanimoto.

6. The method of claim 4 wherein said expanding is activated on said larger number of nearest neighbors to further expand the number of nearest neighbors.

7. A method for associative graph search for finding a K nearest neighbors of a query object, the method comprising:
having a K-nearest neighbor (KNN) graph containing an index of an object to a database and W indexes of known neighbors of said object stored in a host processor, said database storing full dimension vectors of objects;

having a plurality of reduced dimension vectors stored in an associative memory array forming part of an associative processing unit (APU);

obtaining in said APU a reduced dimension query vector of said query object;

performing in said APU a first k nearest neighbor (KNN) algorithm to find a first set of nearest neighbor objects of said reduced dimension query vector in a dataset of reduced dimension vectors stored in said APU, said performing occurring in a constant complexity irrespective of the size of said first set;

obtaining in said host processor for each of said nearest neighbor object additional known neighbors from said KNN graph;

fetching in said host processor full dimension vectors of all said first neighbors and said additional known neighbors; and performing in said host processor a second KNN search algorithm to find said K nearest neighbors of said query object out of said first neighbors and said additional known neighbors.

8. The method of claim 7 wherein said performing a first K nearest neighbor (KNN) algorithm comprises using a similarity search method which is one of: Hamming distance, L1, L2, and Tanimoto.

9. The method of claim 7 wherein said obtaining is activated on said known neighbors to further expand a number of said nearest neighbors.

* * * * *